United States Patent
Schröter

(10) Patent No.: US 11,927,287 B2
(45) Date of Patent: Mar. 12, 2024

(54) CONNECTION UNIT

(71) Applicant: Fränkische Industrial Pipes GMBH & CO. KG, Königsberg (DE)

(72) Inventor: Sören Schröter, Viereth-Trunstadt (DE)

(73) Assignee: Fränkische Industrial Pipes GMBH & CO. KG, Königsberg (DE)

( * ) Notice: Subject to any disclaimer, the term of this patent is extended or adjusted under 35 U.S.C. 154(b) by 404 days.

(21) Appl. No.: 17/292,519

(22) PCT Filed: Nov. 13, 2019

(86) PCT No.: PCT/EP2019/081105
§ 371 (c)(1),
(2) Date: May 10, 2021

(87) PCT Pub. No.: WO2020/099454
PCT Pub. Date: May 22, 2020

(65) Prior Publication Data
US 2021/0396336 A1    Dec. 23, 2021

(30) Foreign Application Priority Data

Nov. 14, 2018  (DE) ...................... 10 2018 219 440.8

(51) Int. Cl.
*F16L 37/084*    (2006.01)

(52) U.S. Cl.
CPC ....... *F16L 37/0841* (2013.01); *F16L 2201/10* (2013.01); *F16L 2201/60* (2013.01)

(58) Field of Classification Search
CPC . F16L 37/144; F16L 37/1225; F16L 37/0885; F16L 2201/10; F16L 2201/60
See application file for complete search history.

(56) References Cited

U.S. PATENT DOCUMENTS

| | | | |
|---|---|---|---|
| 6,082,779 A | | 7/2000 | Lesser et al. |
| 6,649,829 B2 * | | 11/2003 | Garber ................ F16L 37/0841 |
| 2006/0076419 A1 * | | 4/2006 | Johnson .................. F16L 33/30 |
| 2013/0015656 A1 | | 1/2013 | Ehrke et al. |
| 2018/0266602 A1 | | 9/2018 | Fremont |

(Continued)

FOREIGN PATENT DOCUMENTS

| | | |
|---|---|---|
| CN | 105980760 A | 9/2016 |
| DE | 19708377 C1 | 6/1998 |
| DE | 202005012839 U1 | 11/2005 |

(Continued)

OTHER PUBLICATIONS

German Application No. 10 2018 219 440.8, German Search Report dated Aug. 19, 2019, 8 pages.

(Continued)

*Primary Examiner* — Zachary T Dragicevich
(74) *Attorney, Agent, or Firm* — Kilpatrick Townsend & Stockton LLP

(57) ABSTRACT

A connection unit for connecting fluid lines is described, wherein the connection unit comprises a first connection body and a second connection body, wherein the connection unit comprises a machine-readable code which is not detectable when the first connection body and the second connection body are in an unconnected state and which is detectable when the first connection body and the second connection body are in a connected state.

15 Claims, 7 Drawing Sheets

(56) References Cited

U.S. PATENT DOCUMENTS

2019/0040982 A1    2/2019  Cantrell et al.
2019/0049049 A1*   2/2019  Ignaczak .......... G06K 19/07758

FOREIGN PATENT DOCUMENTS

| DE | 202005015714 U1 | 2/2007 |
| DE | 202016106929 U1 | 3/2018 |
| EP | 2395458 A1 | 12/2011 |
| WO | 2018102213 A1 | 6/2018 |
| WO | 2019126447 A1 | 6/2019 |

OTHER PUBLICATIONS

Chinese Application No. CN201980075429.8, "Office Action", dated Aug. 2, 2022, 10 pages.
International Application No. PCT/EP2019/081105, International Search Report and Written Opinion, dated Feb. 26, 2020, 14 pages.

* cited by examiner

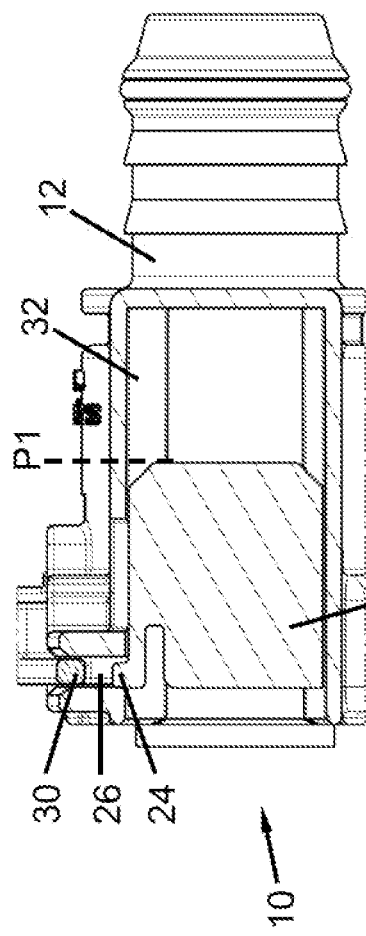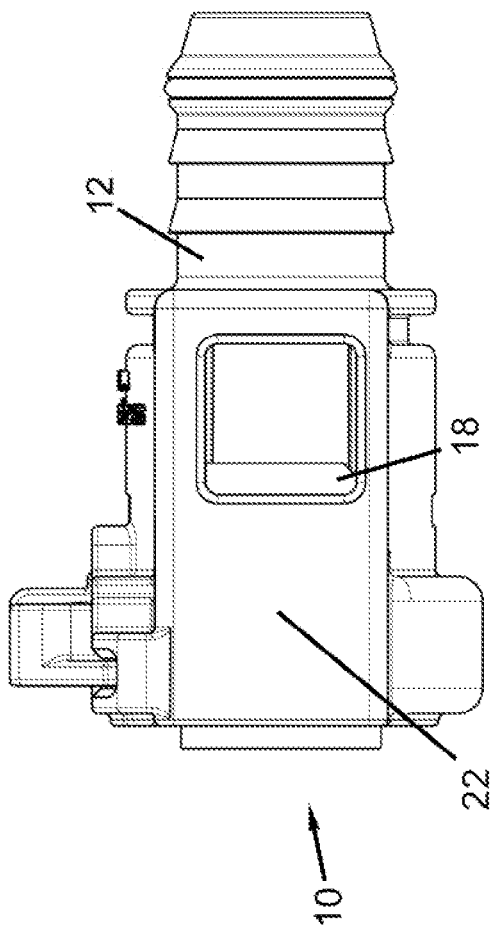

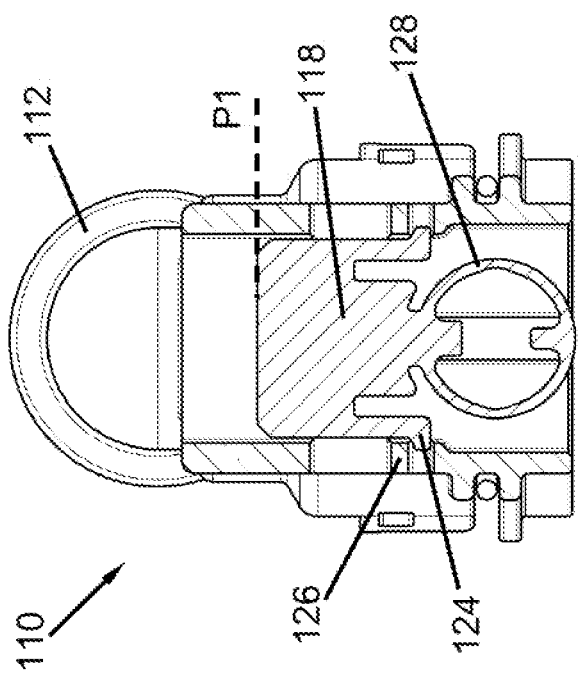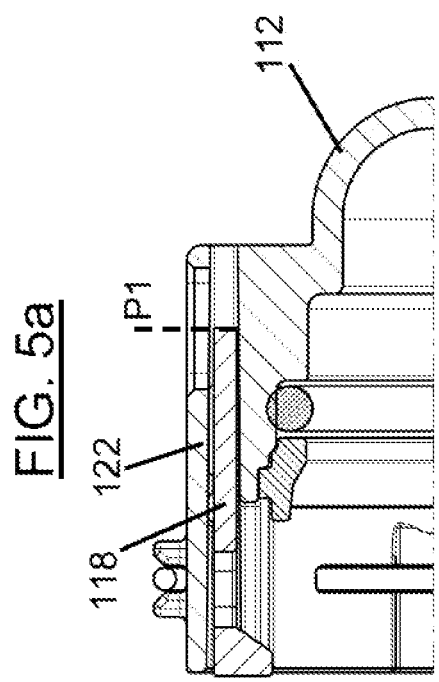
FIG. 5a
FIG. 5b

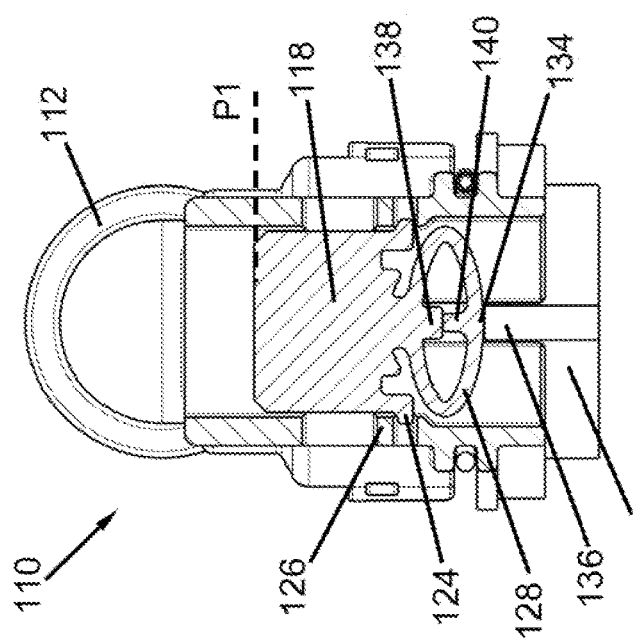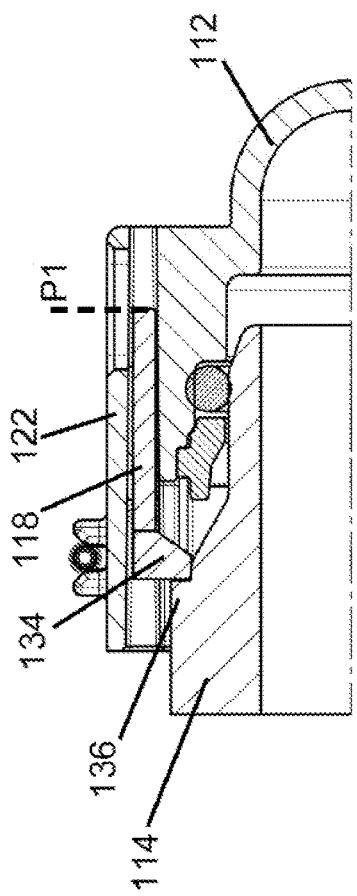

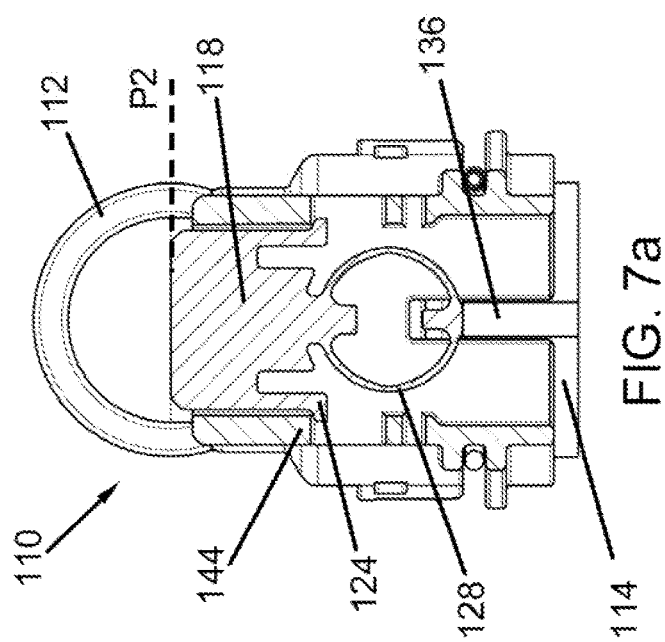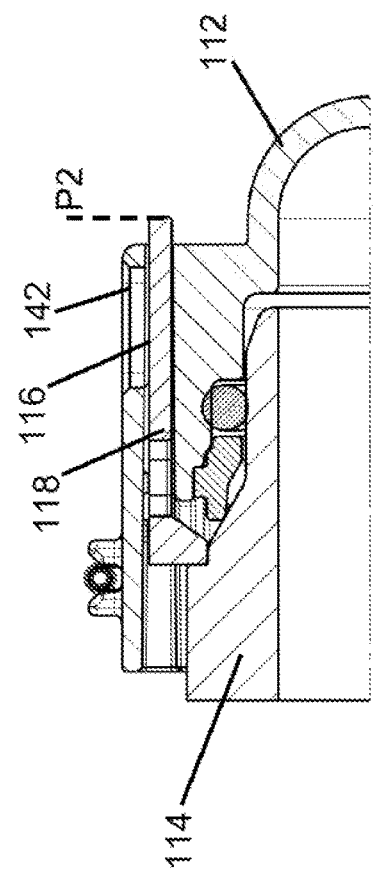

CONNECTION UNIT

CROSS REFERENCE TO RELATED APPLICATION

This application is a U.S. national phase of International Patent Application No. PCT/EP2019/081105 filed on Nov. 13, 2019, which claims priority to German Patent Application No. 10 2018 219 440.8, filed in Germany on Nov. 14, 2018. The entire contents of both applications are hereby incorporated herein by this reference.

TECHNICAL FIELD

The invention relates to a connection unit for connecting fluid lines.

BACKGROUND

A frequent problem when connecting fluid lines is that, for example, a fitter has to verify that all connection units are correctly connected.

Existing methods, such as the recording of specific dimensions of the connection units and/or manually noting said recording, are mostly very time-consuming and error-prone.

Therefore, the problem addressed by the present invention is that of providing a connection unit which allows for an improved degree of readability, in particular using scanners.

SUMMARY

According to the invention, this problem is solved by a connection unit for connecting fluid lines, wherein the connection unit comprises a first connection body which is designed to be connected to a first fluid line and a second connection body which is designed to be connected to a second fluid line, wherein the first connection body and the second connection body are designed to be connected to one another such that a fluid connection is established between the two fluid lines, and wherein the connection unit further comprises a machine-readable code which is not detectable in an unconnected state of the first connection body and the second connection body and which is detectable in a connected state of the first connection body and the second connection body, detectable in particular from an outer side of the connection unit.

For this purpose, visibility of the code is not necessarily required. For example, the code can be stored on a radio frequency identification ("RFID") chip, wherein the RFID chip is designed such that it can only be detected when the first connection body is correctly connected to the second connection body. For example, the RFID chip can be surrounded by a metallic housing which is designed to shield the RFID chip from an outer side such that it cannot be detected in the unconnected or incorrectly connected state of the two connection bodies. The metallic housing can be attached to the connection body in the form of an attachment which carries the RFID chip. The housing can also have a detection portion, for example a recess which is designed to allow for a detection of the RFID chip through the shielding housing when the RFID chip has been transferred from the non-detectable state to a detectable state due to a correct connection of the two connection bodies. This can be realised by displacing the RFID chip from a position shielded by the housing to a position assigned to the detection portion and/or by "switching on" the RFID chip, for example by closing a contact in a conductor path of the RFID chip.

A "connection unit for connecting fluid lines" herein refers to a connection unit which can establish a fluid connection between at least two fluid lines, which connection is sealed towards the outside.

In particular, the portion of the connection unit that carries the machine-readable code can be designed to be rotationally displaceable. For example, if the machine-readable code is arranged on the first connection body, the first connection body can be constructed from at least two components. A first component carrying the machine-readable code can be rotatably mounted relative to a second component of the first connection body or it can be connectable to the second component of the first connection body in a plurality of angular positions. For example, it is conceivable that the second component of the first connection body has latching positions at an angular distance of 60° each, via which the first component can be connected to the second component, in particular by forming a snap-in connection. For example, in the case of a curved fluid line defined by the first connection body, it can be made possible to align the machine-readable code substantially independently of a course of the curved fluid line, i.e. an installation position of the first connection body.

The code of the connection unit can advantageously be an individual code, in particular a one-dimensional or two-dimensional digital code, by means of which at least one of the first and the second connection body, in particular the associated connection unit, can be identified in an unambiguous manner. For example, the code can be a barcode or a QR a quick response ("QR") code, a single-coloured code or a multicoloured code, for example in the form of an in particular circular colour field.

The code can be applied as a laser marking or as an adhesive label.

In a development of the invention, the code can be arranged on a code element of the connection unit that is separate from the first and the second connection body.

The code element can be displaceable relative to the first and/or the second connection body from a non-detectable position to a detectable position upon an in particular complete engagement of the first connection body with the second connection body.

In this case, the code element can be designed to be displaceable exactly once from the non-detectable position to the detectable position in a non-destructive manner.

In particular, it can be conceivable that the code element on one of the first and the second connection body is already in the non-detectable position before the first connection body makes contact with the second connection body and the code can be covered in this position by a portion of the relevant connection body. For this purpose, the code element can be inserted into a slot on one of the connection bodies in the non-detectable position before the first and second connection body are connected to one another, so that, in this position, it cannot be detected, in particular is not visible, from the outside. The slot can extend, for example, in the direction of movement of the code element from the non-detectable position to the detectable position over a greater length than the length of the code element, in particular over more than twice the length of the code element.

In a development of the invention, the code element can comprise a spring device which is designed to displace the code element from the non-detectable position to the detectable position when a force acts on the code element. In this case, the spring device can be designed such that no further action of the other connection body is necessary to displace the code element. Therefore, the spring device can be designed to displace the code element entirely from the non-detectable position to the detectable position is after the code element has been released. In this way, the code element can be prevented from being in a partially visible position, in particular adjacent to the non-detectable position and/or the detectable position, for a period that is sufficient to detect the code by machine, resulting in the possible generation of incorrect detections of the connection unit or of at least one of the connection bodies.

In this case, the spring device can be designed to be integral with the code element. For example, the code element and the spring device can be designed as a one-piece injection-moulded part. In particular, the spring device can be designed as at least one elastic ring, in particular as three elastic rings connected to one another. The code element and the spring device can extend in a common plane and can advantageously have a substantially equal thickness from one surface of the machine-readable code to an opposite side. The spring device can also have a delimiting device which is designed to delimit a maximum compression and/or expansion of the spring device. The delimiting device can be formed, for example, by two projections which are arranged within an elastic spring ring and which can come into contact during compression.

Instead of designing the code element so as to be integral with a spring element made, for example, of plastic, the code element can be provided with a separate spring advantageously made of metal. In this case, the code element can be arranged on a box-shaped, in particular multi-part element which is pushed together in the non-detectable position, i.e. when the spring or springs are tensioned, and secured by a snap-in connection on the relevant connection body. A projection on the relevant other connection body releases the snap-in connection when the first and the second connection body are brought together, for example in that the projection displaces one arm of the snap-in connection. The box-shaped element can be pushed apart and the code element can be moved into the detectable position by the spring which is designed, for example, as a plurality of spiral springs.

Advantageously, a displacement path of the code element from the non-detectable position to the detectable position can be greater than a path from a relative position of the first and the second connection body to one another in which the code element attached to one connection body comes into contact with the other connection body, to a relative position of the first and the second connection body to one another in which the two connection bodies are in a connected state. In particular, the displacement path of the code element can be greater by a factor of 1.5-2 than the above-described displacement path of the two connection bodies to one another.

The code element can comprise a latching device which is designed to be in engagement with a corresponding counter-latching device on the relevant connection body at least in the non-detectable position.

In particular, the code element can be assigned to one of the first and the second connection body and a stop can be assigned to, in particular be integral with, the other one of the first and the second connection body, said stop being designed to displace the code element from the non-detectable position to the detectable position when the first connection body engages with the second connection body. Of course, it is also conceivable that the stop is formed on an element that is separate from the first connection body s and the second connection body and which in particular can only be brought into contact with the code element upon a correct connection of the first connection body to the second connection body such that the code element is "triggered," i.e. a displacement of the code element to the detectable position is effected.

In this case, the connection body to which the stop is assigned can comprise a plurality of stops which are in particular evenly distributed around an outer circumference of said connection body. In this way, several options for plugging the two connection bodies into one another or only a single is predetermined option for plugging the two connection bodies into one another can be provided. For this purpose, at least one stop, advantageously a stop which is not used to contact an assigned stop portion of the code element, can serve as an orientation device and/or orientation safeguard, for example, in that the stop engages in a groove, so that, in particular through the interaction of the stop and the groove, a rotation of the connection bodies relative to one another can be prevented.

The code element can comprise a guide device which is designed such that the code element assumes a predetermined orientation at least in the detectable position. For example, said guide device can be designed as a recess in which a projection of the code element engages.

In the detectable position, with the exception of the portion on which the code is arranged, the code element can be completely surrounded by the connection unit or the relevant connection body. This can prevent the code element from breaking off or can prevent other damage to or manipulations of the code element.

Advantageously, the first and/or the second connection body can inherently form a curved fluid channel and the code can be arranged on a side of the connection unit which is opposite to a side on which a centre of curvature corresponding to the curvature is arranged. Therefore, the code element on a curved connection unit can always be arranged on the outer side thereof in relation to the curvature progression. As a result, a detectability of the code can be improved or facilitated.

BRIEF DESCRIPTION OF THE SEVERAL VIEWS OF THE DRAWINGS

In the following, the invention will be described using an embodiment with reference to the accompanying drawings, in which

FIG. 2a is a lateral cross-sectional view of the connection unit according to the invention in a non-detectable position;

FIG. 2b is a side view the connection unit of FIG. 2a;

FIG. 3b is a side view the connection unit of FIG. 3a;

FIG. 5a is a first cross-sectional view of the connection unit according to

FIG. 4 in a non-detectable position;

FIG. 5b is a second cross-sectional view of the connection unit according to FIG. 4 in a non-detectable position;

FIG. 6a is a cross-sectional view analogous to FIG. 5a of the connection unit according to FIG. 4 in a non-detectable position, wherein the two connection bodies of the connection unit according to the invention are partially inserted into one another;

FIG. 6b is a cross-sectional view analogous to FIG. 5b of the connection unit according to FIG. 4 in a non-detectable position, wherein the two connection bodies of the connection unit according to the invention are partially inserted into one another;

FIG. 7a is a cross-sectional view analogous to FIG. 5a of the connection unit according to FIG. 4 in a detectable position; and FIG. 7b is a cross-sectional view analogous to FIG. 5b of the connection unit according to FIG. 4 in a detectable position.

DETAILED DESCRIPTION

Figure 1:
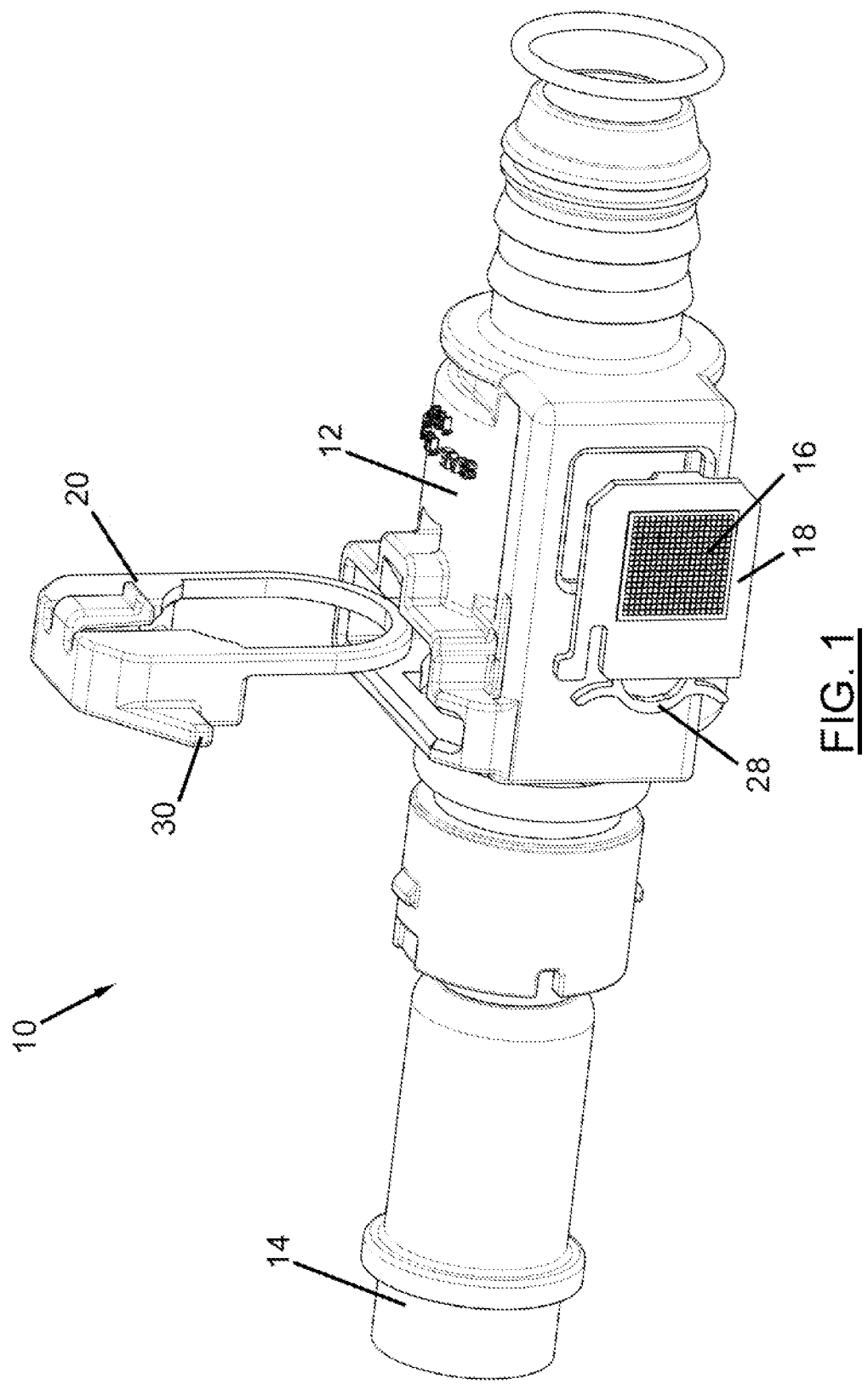
FIG. 1 is a perspective side view of an exploded drawing of a connection unit according to the invention.

In FIG. 1, a connection unit according to the invention is generally denoted with reference sign 10.

The connection unit comprises a first connection body 12 and a second connection body 14. The connection unit furthermore comprises a machine-readable code 16 which cannot be detected in an unconnected state of the first connection body 12 and the second connection body 14 (see also FIG. 2b) and which can be detected, i.e. is visible here, in a connected state of the first connection body 12 and the second connection body 14 (see FIG. 3b).

In this case, the code 16 is a two-dimensional QR code applied as a laser marking.

FIG. 1 also shows that the code 16 is arranged on a code element 18 of the connection unit 10 that is separate from the first 12 and the second connection body 14.

FIG. 1 also shows a retaining element 20 formed separately from the first connection body 12 and the second connection body 14, which upon a complete connection of the first connection body 12 to the second connection io body 14 can be inserted into the first connection body 12 such that the retaining element 20 comes into contact with the code element 18.

FIGS. 2a and 2b show that the code element 18 is already present on the first connection body 12 in the non-detectable position P1 before the first is connection body 12 contacts the second connection body 14 (see FIG. 2a). In said position P1, the code 16 is covered by a portion 22 of the first connection body 12.

In this case, the code element 18 comprises a latching device 24 which is designed to engage in the non-detectable position P1 with a corresponding counter-latching device 26 on the first connection body 12.

Figure 3A:
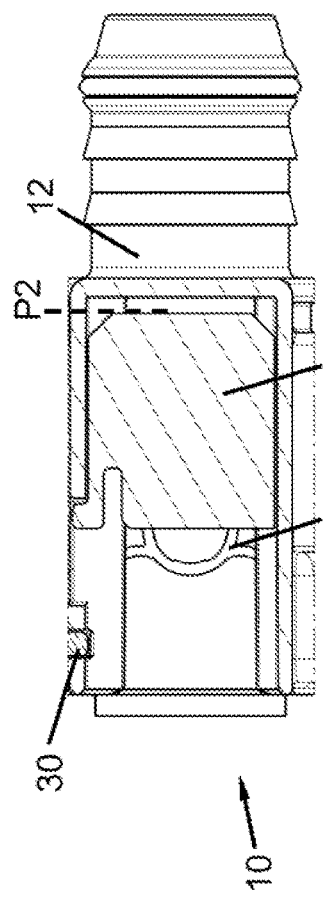
FIG. 3a is a lateral cross-sectional view of the connection unit according to the invention in a detectable position.

Furthermore, the code element 18 comprises a spring device 28 (see FIGS. 1, 3a, and 3c) which is designed to displace the code element 18 from the non-detectable position P1 to a detectable position P2 (see FIG. 3a).

Figure 3B:
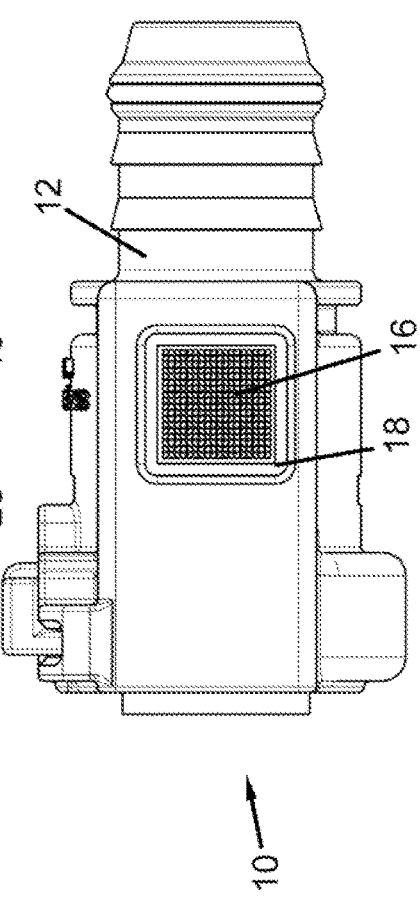
Figure 3C:
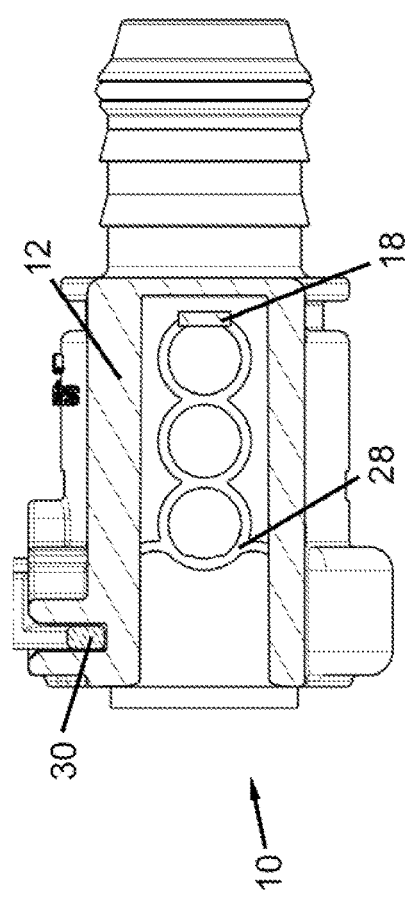
FIG. 3c is a further lateral cross-sectional view of the connection unit according to the invention in the detectable position.

As can be seen in FIG. 3c, the spring device 28 in the depicted embodiment is integral with the code element 18 and designed as three rings. The end of the spring device 28 opposite the code element 18 is connected to the first connection body 12.

The retaining element 20 comprises a stop 30 which is designed to come into contact with the code element 18 in order to release the latching device 24 of the code element 18 from the counter-latching device 26.

The code element 18 also comprises a guide device 32 (see FIG. 2a) which is designed such that the code element 18 assumes a predetermined orientation in at least the detectable position P2.

FIG. 3b shows that, in the detectable position P2, the code element 18 is completely surrounded by the first connection unit 12, with the exception of the portion on which the code 16 is arranged.

Figure 4:
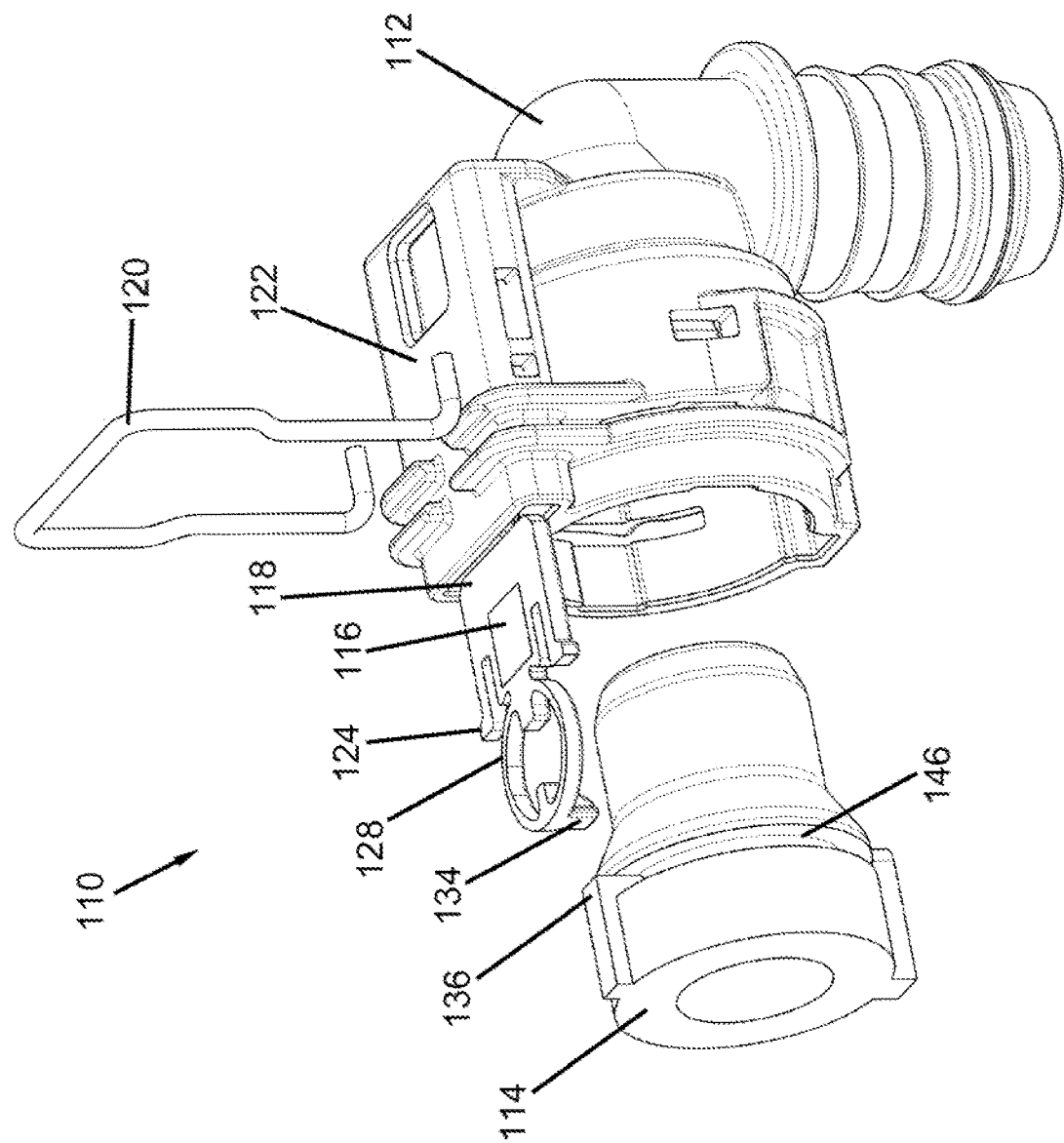
FIG. 4 shows a further embodiment of the connection unit according to the invention.

A further embodiment 110 of the connection unit according to the invention is shown in FIG. 4. In general, it must be noted with regard to the connection unit 110 that all advantages, effects and features of the connection unit 10 is can also be applied to the connection unit 110, and vice versa, and so components of the connection unit 110 that are analogous to the connection unit 10 are described with analogous reference signs, but increased by the number 100.

The connection unit 110 comprises a first connection body 112 and a second connection body 114 which can be connected to one another in order to interconnect respective fluid channels defined therein. A code element 118 having a machine-readable code 116 is connected to the first connection body 112. The code element 118 is integral with a spring device 128 which is formed from an elastic ring. At an end opposite the code 116, the spring device 128 has a stop portion 134 which is designed to come into contact with a stop 136 of the second connection body 114 when the second connection body 114 is inserted into the first connection body 112. Spring-mounted latching devices 124 extend on both longitudinal sides of the code element 118. The embodiment of the connection unit 110 shown in FIG. 4 furthermore has a retaining element 120 which is used to secure the first connection body 112 and the second connection body 114 to one another in a correctly interconnected state.

FIG. 5a shows the code element 118 in a non-detectable position P1 on the first connection body 112. In this case, the latching devices 124 are in engagement with corresponding counter-latching devices 126. The spring device 128 is in an unloaded and non-pretensioned state. In this non-detectable position P1, a portion 122 of the first connection body 112 covers the code 116 arranged on the code element 118, so that it cannot be detected from an outer side (see FIG. 5b).

If the second connection body 114 is now inserted into the first connection body 112, as shown in FIGS. 6a and 6b, the stop 136 of the second connection body 114 comes into contact with the stop portion 134 of the code element 118 or the spring device 128 thereof. Upon further insertion of the second is connection body 114 into the first connection body 112, the spring device 128 of the code element 118 is preloaded such that the elastic ring is compressed into an oval extending mainly transversely to an insertion direction of the second connection body 114 into the first connection body 112. With maximum compression of the elastic ring of the spring device 128, two opposing surfaces contact each other which, in the depicted embodiment, are arranged on two projections 138 and 140 protruding inwardly with respect to the elastic ring in order to prevent further compression of the spring device 128.

During the preloading of the spring device 128, the code element 118 remains in the non-detectable position P1, so that the code 116 remains covered by the portion 122. This can be achieved, for example, in that a holding force exerted on the code element 118 by the latching devices 124 interacting with the counter-latching devices 126 is greater than a restoring force exerted by the spring device 128.

If the second connection body 114 is displaced beyond the point shown in

FIGS. 6a and 6b, the code element 118, in the sense of a rigid body, since the spring device 128 is bridged by the contacting of the two projections 138 and 140, is pushed out of the non-detectable position P1 in such a way that the latching devices 124, bearing against the counter-latching devices 126, are displaced radially inwardly. When the latching devices 124 are sufficiently displaced in order to be released from the counter-latching devices 126, the restoring force of the spring device 128 exerts a force on the portion of the code element 118 carrying the code 116, so that said portion is displaced to a detectable position P2 which can be seen in FIGS. 7*a* and 7*b*.

In said detectable position P2, the code 116 is arranged relative to a cut-out 142 of the first connection body 112 such that the code 116 can be detected from an outer side of the connection unit 110. For this purpose, in order to be able to determine in a predetermined manner that the code element 118 is assumes the detectable position P2, the latching devices 124 can come into contact with further counter-latching devices 144 which are designed to prevent a displacement of the code element 118 beyond the detectable position P2. In particular, in the detectable position P2 of the code element 118, the spring device 128 can also remain in a substantially relaxed state with the stop 136 of the second connection body 114 in order to prevent, due to the spring effect of the spring device 128, a displacement of the code element 118 from the detectable position P2 in the direction of the non-detectable position P1.

If the second connection body 114 is inserted into the first connection body 112 in the predetermined correct manner, the bow-like retaining element 120 can be placed onto the first connection body 112, wherein it simultaneously engages in a groove 146 of the second connection body 114 (see FIG. 4) in order to secure the second connection body 114 to the first connection body 112.

What is claimed is:

1. A connection unit for connecting fluid lines,
   wherein the connection unit has a first connection body which is designed to be connected to a first fluid line not belonging to the connection unit, and a second connection body which is designed to be connected to a second fluid line not belonging to the connection unit,
   wherein the first connection body and the second connection body are designed to be connected to one another such that a fluid connection is established between the first fluid line and the second fluid line,
   wherein the connection unit comprises a machine-readable code which is not detectable in an unconnected state of the first connection body and the second connection body and which is detectable in a connected state of the first connection body and the second connection body, the machine-readable code being detectable in the connected state from an outer side of the connection unit,
   wherein the machine-readable code is arranged on a code element of the connection unit that is separate from the first connection body and the second connection body,
   wherein the code element is displaceable relative to the first connection body or the second connection body from a non-detectable position to a detectable position upon a complete engagement of the first connection body with the second connection body, and
   wherein the code element comprises a spring device which is designed to displace the code element from the non-detectable position to the detectable position when a force acts on the code element.

2. The connection unit according to claim 1,
   wherein the machine-readable code of the connection unit is an individual code by means of which at least one of the first connection body and the second connection body can be identified.

3. The connection unit according to claim 2,
   wherein the individual code is a one-dimensional digital code or a two-dimensional digital code.

4. The connection unit according to claim 1,
   wherein in that the machine-readable code is applied as a laser marking or as an adhesive label.

5. The connection unit according to claim 1,
   wherein the code element is already in the non-detectable position before the first connection body makes contact with the second connection body and the machine-readable code is covered in this position by a portion of the first connection body or the second connection body.

6. The connection unit according to claim 1,
   wherein the spring device is integral with the code element.

7. The connection unit according to claim 1,
   wherein a displacement path of the code element from the non-detectable position to the detectable position is greater than a path from a relative position of the first connection body and the second connection body to one another in which the code element attached to one connection body comes into contact with the other connection body, to an additional relative position of the first connection body and the second connection body to one another in which the two connection bodies are in the connected state.

8. The connection unit according to claim 1,
   wherein the code element further comprises a latching device which is designed to be in engagement with a corresponding counter-latching device on the first connection body or the second connection body at least in the non-detectable position.

9. The connection unit according to claim 1,
   wherein the code element is assigned to one of the first connection body and the second connection body and a stop is assigned to a particular element that is one of: the other one of the first connection body and the second connection body or an additional element that is separate from the two connection bodies,
   wherein the stop is designed to displace the code element from the non-detectable position to the detectable position when the first connection body engages with the second connection body.

10. The connection unit according to claim 9,
    wherein the particular element to which the stop is assigned comprises a plurality of stops.

11. The connection unit according to claim 10,
    wherein the plurality of stops are evenly distributed around an outer circumference of the particular element to which the stop is assigned.

12. The connection unit according to claim 9,
    wherein the stop is integral with the assigned one of the first connection body, the second connection body, or the additional element that is separate from the two connection bodies.

13. The connection unit according to claim 1,
    wherein the code element further comprises a guide device which is designed such that the code element assumes a predetermined orientation in at least the detectable position.

14. The connection unit according to claim 1,
    wherein, in the detectable position, the code element is completely surrounded by the connection unit, the first connection body, or the second connection body, with the exception of a portion on which the machine-readable code is arranged.

15. The connection unit according to claim 1, wherein the first connection body or the second connection body inherently forms a curved fluid channel and the machine-readable code is arranged on a side of the connection unit which is opposite to an additional side on which a center of curvature corresponding to the curved fluid channel is arranged.

* * * * *